United States Patent
Obermayer

[15] 3,662,882
[45] May 16, 1972

[54] METHOD AND APPARATUS FOR QUALITY CONTROL OF EXPLOSIVE PRIMERS BY CHARACTERISTIC X-RAY EMISSION

[72] Inventor: Arthur S. Obermayer, Newton, Mass.

[73] Assignee: Molecular Research Corporation, Cambridge, Mass.

[22] Filed: June 25, 1969

[21] Appl. No.: 836,248

[52] U.S. Cl. ..........................209/111.5, 86/32, 250/83.3 D
[51] Int. Cl. ..........................................................B07c 5/346
[58] Field of Search ........................250/83.3 D, 106; 86/32; 209/111.5, 121

[56] References Cited

UNITED STATES PATENTS 3,089,378   5/1963   Berk..........................................86/32
3,146,347   8/1964   Ziegler..........................250/83.3 D X
3,448,264   6/1969   Rhodes..........................250/83.3 D X

*Primary Examiner*—Richard A. Schacher
*Attorney*—Chittick, Pfund, Birch, Samuels & Gauthier

[57] ABSTRACT

A method and apparatus for indirectly measuring the weight or composition of an explosive primer by utilizing the characteristic X-ray emissions from a radiation excitable constituent of the primer. The explosive primer is exposed to an external source of ionizing radiation which induces characteristic X-ray emissions of the selected primer constituent. The quantity of the emitted characteristic X-rays is determined by an ionizing radiation energy-resolving detection system. Since the quantity of the emitted characteristic X-rays is a function of the amount of the excitable constituent present in the primer, determination of the quantity of the X-rays emitted provides an indirect measurement of the weight of the primer.

10 Claims, 3 Drawing Figures

INVENTOR.
ARTHUR S. OBERMAYER

METHOD AND APPARATUS FOR QUALITY CONTROL OF EXPLOSIVE PRIMERS BY CHARACTERISTIC X-RAY EMISSION

BACKGROUND OF THE INVENTION

This invention relates in general to the field of munitions and, more particularly, to a non-destructive method and apparatus for measuring the weight or composition of explosive "primers".

The term "primer", as used in the munitions art, generally refers to an explosive material which is more sensitive to heat or shock than common high explosives and is used in a small quantity to detonate another explosive. In firearms, the primer initiates the propelling charge, in a fuse the primer acts as the detonator, and in mining or related operations the primer is in the blasting or percussion cap. The quantity of the primer employed in each of these applications can be quite critical. Relatively small variations in the weight of the primer can produce quite large variations in the ignition time of the main explosive. If an insufficient amount of primer is used, the chance of a mis-fire or lag-fire is greatly increased. On the other hand, too much primer can cause too violant an explosion.

Direct weighing of the primer during the manufacturing process is not practical because the primer is normally encased within a brass container and the variations in the weight of the brass container are too great in comparison with the small differences in weight of the dry primer. Any primer weight variations are therefore masked by the within tolerances weight variations of the brass container. Pre-weighing of the primer before loading the primer in its container, is difficult because the primer is normally added to the container in a wet state in order to avoid the explosive hazards incident to the handling of the primer in a dry state. After loading the primer in a wet condition the primer is dried and ready for use. The weight of the primer should be ascertained after the loading operation in order to provide an acceptable quality control of the assembled primers and containers.

Various types of gaging machines have been suggested to eliminate light or overweight primers, but none have provided satisfactory separation of acceptable from unacceptable primer weights. Recently, a method has been proposed in which the primer composition is made radioactive by the inclusion of a radioactive element or by irradiating it with slow neutrons. See U.S. Pat. No. 3,089,378, issued May 14, 1963, to Sigmund Berk for Radioisotope Method for Measuring the Weight of the Contents of Assembled Items. According to the Berk patent, the radiation emitted by the radioactive primer is directly proportional to the weight of the primer. A third method suggested by Berk is to place a source of radiation in the bottom of the primer cup prior to the addition of the primer composition. In this case, the radiation transmitted through the top of the primer cup is inversely proportional to the weight of the primer mix in the cup. The Berk methods of radioactive tagging of the primer, inclusion of a radioactive source in the primer container or neutron activation of the primer have among other things the disadvantage that the primer itself or the surrounding container remains radioactive for a long period of time.

It is accordingly a general object of the present invention to provide a method and apparatus for accurately weighing an explosive primer within a metal or other container which eliminates the problems associated with the prior art gaging machines and radioactive tagging or neutron activation techniques.

It is a specific object of the invention to provide a method and apparatus for determining the weight of explosive primers by utilizing the characteristic X-rays emitted by a radiation excitable constituent in the primer.

It is a feature of the invention that the apparatus can be readily incorporated in existing munition production lines without extensive modification.

In the accomplishment of these objects, an explosive primer containing a radiation excitable constituent, such as for example, the commonly employed lead styphnate, is exposed to an external source of ionizing radiation. During the exposure, the ionizing radiation causes the primer lead to emit characteristic X-rays. The quantity of the characteristic X-rays is a function of the amount of lead in the primer. By determining the quantity of the characteristic X-rays emitted by the selected primer constituent, it is possible to measure the amount of the constituent present in the primer. The measurement of the amount of the selected primer constituent provides in turn, an indirect measurement of the weight of the primer.

These objects and features and other objects and features of the invention will best be understood from a detailed description of a preferred embodiment thereof, selected for purposes of illustration, and shown in the accompanying drawings in which.

Figure 1:
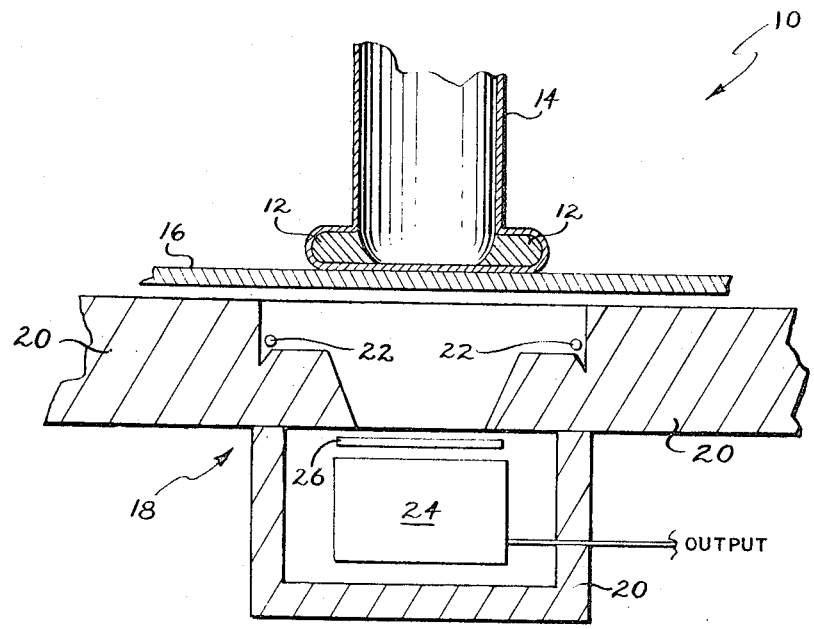
FIG. 1 is a diagrammatic view in partial section of an inspection station showing the geometric relationship between a primer filled rim-fire cartridge and the detector assembly of the present invention.

Turning now to the drawings, and particularly to FIG. 1 thereof, there is shown in diagrammatic view in partial section, an inspection station, indicated generally by the reference numeral 10 for determining the weight of an explosive primer 12 in an annular or ring configuration contained within a rimfire cartridge 14. The cartridge 14 is supported by and transported through the inspection station 10 by means of a conventional conveyor belt 16. Positioned below the conveyor belt 16 is a shielded assembly, indicated generally by the reference numeral 18, comprising shielding 20, a source of ionizing radiation 22, an ionizing radiation detector 24 and preferably, an X-ray absorption edge filter 26.

Figure 2:
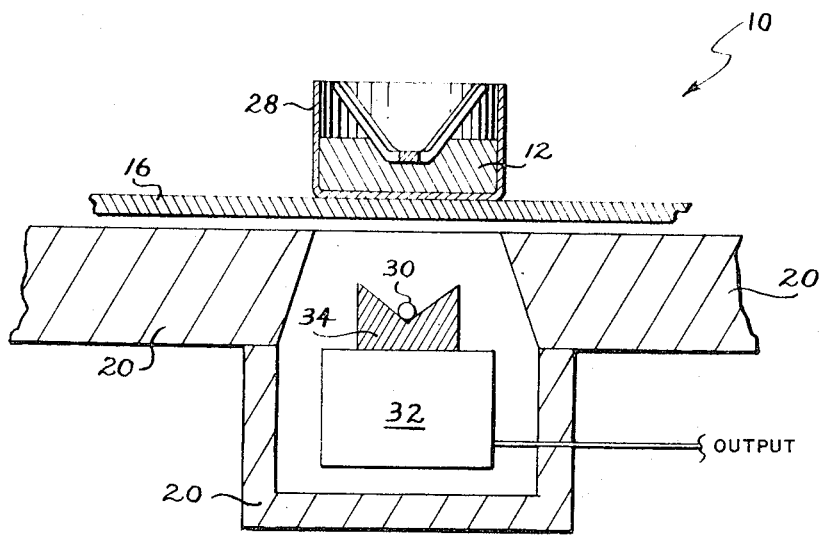
FIG. 2 is another diagrammatic view in partial section of an inspection station showing the relationship between a loaded primer cup and the detector assembly; and, FIG. 3 is a functional block diagram of the apparatus of the present invention.

FIG. 2 illustrates a slightly different source-primer-detector geometry wherein a primer cup 28 loaded with primer 12 is positioned on the moving conveyor belt 16. Instead of a ring source for the ionizing radiation, this geometry utilizes a point isotope source of radiation 30 which is shielded from a detector 32 by means of shielding 34. Although no X-ray absorption edge filter has been illustrated in FIG. 2, it should be understood that a filter covering the field of view of the detector 32 can be employed. It should also be understood that the method of the present invention is not limited to any particular source-primer-detector geometry and that the geometries described above can be interchanged with respect to the primer configurations illustrated in FIGS. 1 and 2.

Figure 3:
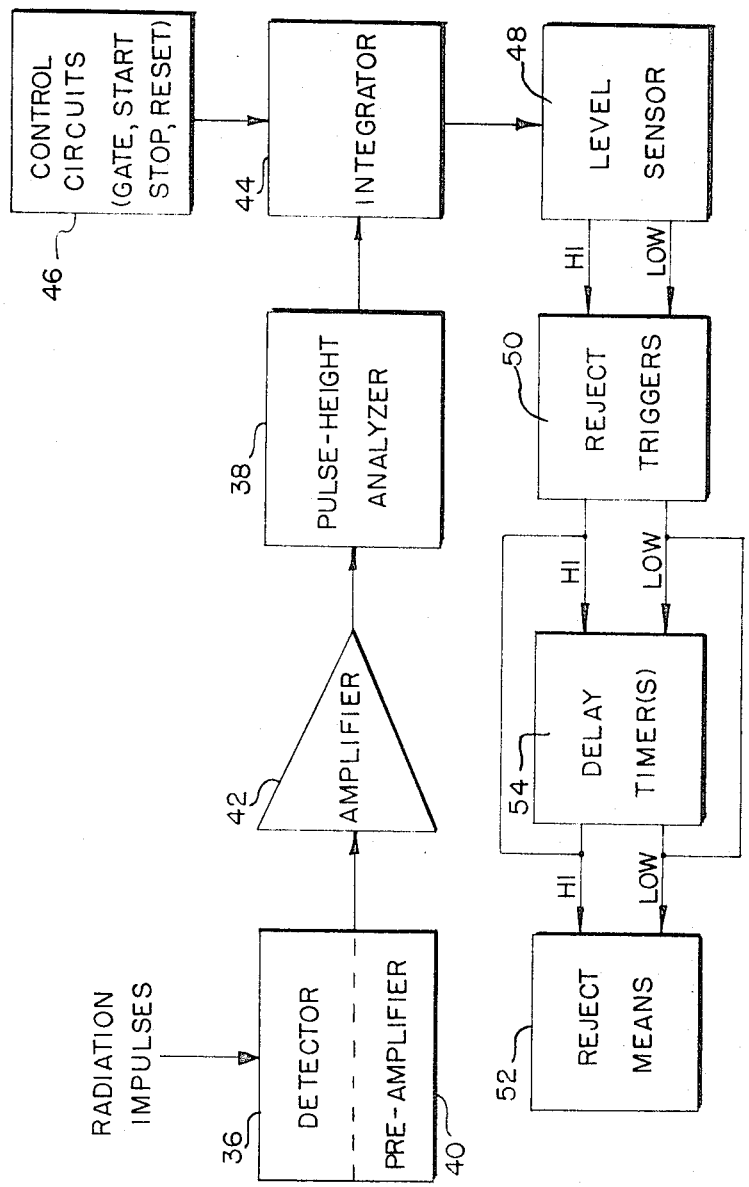

Having briefly described the physical arrangement of the inspection station 10, I will now discuss the method of determining the weight of the primer 12 and will describe the electronic circuitry shown in FIG. 3 which instruments the method. The method of the present invention utilizes the characteristic X-ray emissions from a moderate to heavy element in the primer composition. When this element or primer constituent is exposed to ionizing radiation from an external source, the constituent absorbs the radiation and as a result emits X-rays whose energy is characteristic of the element or constituent which absorbed the external radiation.

The external ionizing radiation can be X-rays, electrons or gamma rays provided by an X-ray machine, an electron accelerator or a radioisotope In order to induce characteristic X-ray emission in the selected primer constituent, the external radiation must have an energy above the X-ray absorption edge of the primer constituent to be measured. Maximum efficiency occurs when the energy of the radiation source is only slightly above the absorption edge, but fluorescence will occur even when the radiation source has a much greater energy than the absorption edge. X-ray yields are greatest when the K-edge of a heavy element is used, but L-edge X-ray emissions can be employed and has some practical advantages, such as, reduced back scattering.

The choice of the external radiation source depends upon a number of parameters, such as, the element being measured, whether K-shell or L-shell X-rays are to be produced, half-lives and extraneous emissions of radioisotopes, effect of attenuation by the container walls and other absorbing materials, availability of X-ray tubes with the desired geometry and finally cost. For purposes of illustration and simplicity, the external source of ionizing radiation in FIGS. 1 and 2 has been depicted as an isotope ring and point source, respectively. A number of isotopes can be employed to provide ionizing radiation having the necessary energy. For example, cobalt-57 (half-life: 267 days; X-ray emission: 122 kev) or gadolimium-153 (half-life: 200 days; X-ray emission: 103 and 97 kev) are particularly practical for measurement of K-shell fluorescence of lead (K-edge: 88 kev) which is most often in explosive primers in the form of lead styphnate. Barium nitrate is another common component of many explosive primers, and the barium (K-edge: 38 kev) can be excited by an isotope such as americium-241 (half-life: 458 years; X-ray emission: 60 kev).

Mercury fulminate and antimony sulfide are two other heavy metal compounds which are at times employed in explosive primer compositions. The mercy (K-edge: 83 kev) and the antimony (K-edge: 30 kev) can be stimulated by the same isotopes as described for lead and barium, respectively.

The L-shell X-ray emission of lead (L-edge: 15 kev) can be induced by a lower energy X-ray source, but the container walls will significantly attenuate both the X-rays from the external radiation source and the emitted X-rays. Attenuation by the container walls and other primer components is a factor to be considered when an electron source is employed because of the lower penetration and broad energy distribution of the electrons. Such attenuation can be reduced by inserting the radiation source into the primer container during the measurement operation or by measuring the X-rays produced from the open end of the container. It will be appreciated that a radioisotope source of radiation is much more practical from the standpoint of size, if the source is to be inserted and then removed from the primer container. Measurement from the open end of the primer container does not impart any particular constraints upon the source of external radiation and steady state or pulsed X-ray or electron tubes are as appropriate to use as radiation sources as are radioisotopes. However, in practice, they are limited by their greater expense, lack of desirable tube geometries, and replacement cost of targets.

Referring back now to FIGS. 1 and 2 and looking at FIG. 3, the selected primer constituent, e.g., lead is induced to emit characteristic X-rays by the absorption of the ionizing radiation from the external source of radiation 22 or 30. As mentioned previously, the quantity of the characteristic X-rays emitted by the primer constituent is a function of the amount of the constituent present in the primer. Since the amount of the constituent is an indirect measure of the weight of the primer, assuming controlled primer composition, the detected quantity of the characteristic X-rays can be employed to produce a suitable reject control signal for under and over-weight primers.

The detection system employed in instrumenting the method of the present invention must be one which has energy-resolving capability for ionizing radiation. Either proportional, scintillation, or solid-state detectors can be used for this measurement when combined with a discriminator to resolve different voltage pulses and their corresponding energies. Alternatively, a diffracting crystal can be used to provide the X-ray spectral resolution in conjunction with a non-resolving detector, such as, a Geiger tube.

In the preferred embodiment illustrated in FIG. 3, a detector 36 is used together with a pulse-height analyzer 38 to achieve the necessary energy-resolution. Pre-amplifier 40 and amplifier 42 provide the required signal amplification to drive the pulse-height analyzer 38. The output from pulse-height analyzer 38 is integrated by an integrator 44 for a selected time period established by the control circuits 46 (gate, start, stop and reset). For a given time period, the output from the integrator 44 represents the quantity of the characteristic X-rays emitted from the primer constituent and detected by detector 36. Since the quantity of the characteristic X-rays corresponds to the amount of the constituent present in the primer and, indirectly, the weight and composition of the primer, the output from integrator 44 is employed to control the acceptance or rejection of the primer under inspection.

The output from integrator 44 is applied to a level sensor 48 that has preset high and low level limits which correspond to the acceptable amounts of the primer constituent which in turn represent the range of acceptable primer weights. If the output from the integrator is above the preset high limit, the level sensor 48 produces a "hi" output signal which causes reject trigger 50 to produce a "hi" reject signal. The reject signal can be applied either directly to a suitable reject means 52, such as, a spring biased solenoid, or to a delay timer 54 which delays the actuation of the reject means 50 for a predetermined period. The delay times can be used to allow the unacceptable primers to reach the downstream reject means location on the production line. A similar operational sequence occurs if the output from integrator 44 is below the preset lower level of the level sensor 48.

It will be appreciated that the equipment shown in block diagram form in FIG. 3 is well known to those skilled in the art and that the specific circuitry need not be described in any greater detail for an understanding of the invention. A considerable portion of the circuitry shown in FIG. 3 is available as off-the-shelf hardware. For example, a proportional detector system can be assembled by using one of the proportional detector-preamplifier units manufactured by Ortec under No. 109-PC or by Camberra under No. 1406, an Ortec No. 485 or Camberra No. 1415 amplifier, an Ortec No. 406A or Camberra No. 1430 pulse-height analyzer and an Ortec No. 430 or No. 484 integrator or a Camberra No. 1471 integrator. A solid-state detector system can be assembled from an Ortec No. 8,000–45 lithium-drifted germanium detector, an Ortec 118–A pre-amplifier, an Ortec No. 440 amplifier and an Ortec No. 406A pulse-height analyzer. The solid-state detector is cooled by means of a suitable cryostat (not shown) of which Ortec cryoscope No. 8013–08 is a representative example. The scintillation detection system is described below in connection with Example 1.

On the basis of the experimental work described below, the method of determining the amount of a particular constituent in an explosive primer by utilizing the characteristic X-rays emitted by the primer when exposed to an ionizing radiation appears to be effective, practical and accurate.

EXAMPLE 1

The presence of sufficient lead fluorescence for primer analysis was shown by placing 14 mg of lead in the form of its acetylacetonate in a brass shell having 20 mil walls, and exposing this sample to radiation from a 0.4 millicurie cobalt-57 source in the geometry shown in FIG. 1. The detector system was a Tracerlab SC–81 Versa/Matic II Spectrometer equipped with a P–20D Scintillation Detector and a SPG–5 NaI(T1) crystal, adjusted so that a threshold setting of 40 volts corresponded to 50 kev radiation and a threshold setting of 65 volts corresponded to 100 kev radiation. Using a 1 volt window both the above sample and a similar brass sample containing no lead compound were scanned. Subtraction of the blank readings from those of the lead-containing sample gave the following counts per minute due to the lead.

| Threshold | Counts per Minute |
| --- | --- |
| 35 volts | 1670 |
| 40 | 2434 |
| 45 | 4398 |
| 48 | 6248 |
| 49 | 6923 |
| 50 | 7368 |

| | |
|----|------|
| 51 | 7152 |
| 52 | 7116 |
| 53 | 7160 |
| 54 | 6881 |
| 55 | 6016 |
| 60 | 2871 |

It can be seen that the spectrum peaks just over a threshold of 50, which corresponds to an energy of just over 70 kev, the correct value for lead fluorescence. Thus it was the lead content of the sample which was measured. The total counts due to the lead, found by integrating the above spectrum, was found quite adequate for rapid primer determination.

EXAMPLE 2

Using the equipment and geometry of Example 1, with a threshold setting of 40 volts and a window of 15 volts so as to achieve good sensitivity to the lead fluorescent radiation found in Example 1, an empty brass sample and a sample containing 14 milligrams of organic lead were each counted for 1 minute. The counts obtained were 115,680 and 183,210, respectively. Thus the signal due to the lead was 67,530 counts per minute; this signal, in the presence of the observed background, would give a two-sigma precision of ± 0.08 mg, or ± 0.3 percent, in the amount of lead based on standard counting statistics. In more general terms, the observed counting rate was 12,060 counts per minute per millicurie of source strength per milligram of lead, and this would be adequate to achieve good counting statistics under a wide range of practical conditions.

Having described in detail the method and apparatus of my invention, what I desire to claim is:

1. A method for ascertaining the amount of a particular constituent in an explosive primer comprising the steps of:
   a. inducing a characteristic X-ray emission from said primer constituent; and,
   b. determining the quantity of the characteristic X-rays emitted by said constituent, said quantity being a function of the amount of the constituent present in the primer.

2. The method of claim 1 wherein said characteristic X-rays are induced by exposing the primer to ionizing radiation from an external source of radiation, said radiation having an energy above the energy of the X-ray absorption edge of said primer constituent.

3. The method of claim 2 wherein said radiation energy is above the K-edge of said constituent.

4. The method of claim 2 wherein said radiation energy is above the L-edge of said constituent.

5. The method of claim 2 wherein said external radiation comprises electrons.

6. The method of claim 2 wherein said external radiation comprises X-rays.

7. The method of claim 2 wherein said external radiation comprises gamma rays.

8. The method of claim 1 wherein the quantity of the characteristic X-rays is determined by:
   a. exposing a detector of ionizing radiation to the characteristic X-rays emitted by said primer constituent;
   b. resolving the energy distribution in the radiation spectrum detected by said detector; and,
   c. producing an electrical signal representative of the quantity of radiation within the resolved energy range of the characteristic X-ray emission of the primer constituent.

9. An apparatus for indirectly determining the weight and composition of an explosive primer having a radiation excitable constituent, said apparatus comprising:
   means for inducing a characteristic X-ray emission from said radiation excitable primer constituent;
   means responsive to said characteristic X-rays for producing an electrical signal representative of the quantity of the characteristic X-rays emitted by said primer constituent, said quantity being a function of the amount of the constituent present in the primer and an indirect measure of the weight and composition of said primer.

10. A quality control apparatus for accepting or rejecting, on the basis of weight, an explosive primer having a radiation excitable constituent, said apparatus comprising:
   a. means for inducing a characteristic X-ray emission from said radiation excitable primer constituent;
   b. means responsive to said characteristic X-rays for producing an electrical signal representative of the quantity of the characteristic X-rays emitted by said primer constituent, said quantity being a function of the amount of the constituent present in the primer and, thereby an indirect measure of the weight of said primer;
   c. means responsive to said electrical signal for producing a reject control signal whenever the electric signal represents a quantity of the characteristic X-rays that is outside of a predetermined quantity range which defines the amounts of the constituent that correspond to the acceptable range of primer weights; and,
   d. means responsive to said reject control signal for rejecting the under and overweight primers.

* * * * *